US009399501B2

(12) United States Patent
Lazzarin et al.

(10) Patent No.: US 9,399,501 B2
(45) Date of Patent: Jul. 26, 2016

(54) DEVICE FOR STOPPING THE LATERAL DISPLACEMENT OF A BICYCLE CHAIN

(71) Applicant: Campagnolo S.r.l., Vicenza (IT)

(72) Inventors: Leopoldo Lazzarin, Vicenza (IT); Paolo Pasqua, Camisano Vicentino (IT)

(73) Assignee: Campagnolo S.r.l., Vicenza (IT)

( * ) Notice: Subject to any disclaimer, the term of this patent is extended or adjusted under 35 U.S.C. 154(b) by 109 days.

(21) Appl. No.: 14/497,886

(22) Filed: Sep. 26, 2014

(65) Prior Publication Data

US 2015/0099599 A1 Apr. 9, 2015

(30) Foreign Application Priority Data

Oct. 4, 2013 (IT) ............... MI2013A1641

(51) Int. Cl.
*B62M 9/136* (2010.01)
*B62M 9/1342* (2010.01)
*B62M 9/135* (2010.01)
*B62M 9/00* (2006.01)

(52) U.S. Cl.
CPC ............... *B62M 9/136* (2013.01); *B62M 9/135* (2013.01); *B62M 9/1342* (2013.01); *B62M 2009/007* (2013.01)

(58) Field of Classification Search
CPC ..... B62M 9/136; B62M 9/1342; B62M 9/135
See application file for complete search history.

(56) References Cited

U.S. PATENT DOCUMENTS

| 4,832,667 | A | 5/1989 | Wren |
| 5,620,384 | A | 4/1997 | Kojima et al. |
| 6,277,044 | B1 | 8/2001 | Fujimoto |
| 9,061,730 | B2 * | 6/2015 | Inoue ................ B62M 9/136 |
| 2005/0204846 | A1 | 9/2005 | Valle et al. |
| 2010/0172164 | A1 | 7/2010 | Chen et al. |
| 2011/0230287 | A1 * | 9/2011 | Savola ............... B62M 9/136 474/80 |
| 2013/0095969 | A1 * | 4/2013 | Santurbane ........ B62M 9/136 474/140 |

FOREIGN PATENT DOCUMENTS

| EP | 0936134 A1 | 8/1999 |
| EP | 1867563 A2 | 12/2007 |
| JP | 2005247302 A | 9/2005 |

OTHER PUBLICATIONS

Italian Search Report and Written Opinion in Italian Application No. IT MI2013A001641, Apr. 15, 2014 with English translation.
Notice of Reasons for Rejection received on Aug. 18, 2015 in corresponding Japanese Application No. 2014-204282.
Chinese Office Action with English translation for Application No. 201410524829, dated Mar. 1, 2016.

* cited by examiner

*Primary Examiner* — William E Dondero
*Assistant Examiner* — Mark K Buse
(74) *Attorney, Agent, or Firm* — Volpe and Koenig, P.C.

(57) ABSTRACT

The present invention relates to a device for stopping lateral displacement of a bicycle chain. The device comprises a mounting element configured to be mounted on a bicycle frame. The mounting element comprises a first portion configured to be coupled, at a first coupling axis, with a front derailleur of a bicycle, and a second portion configured to be coupled, at a second coupling axis distinct from said first coupling axis, with a stop element that stops the lateral displacement of said chain.

Figure 1:
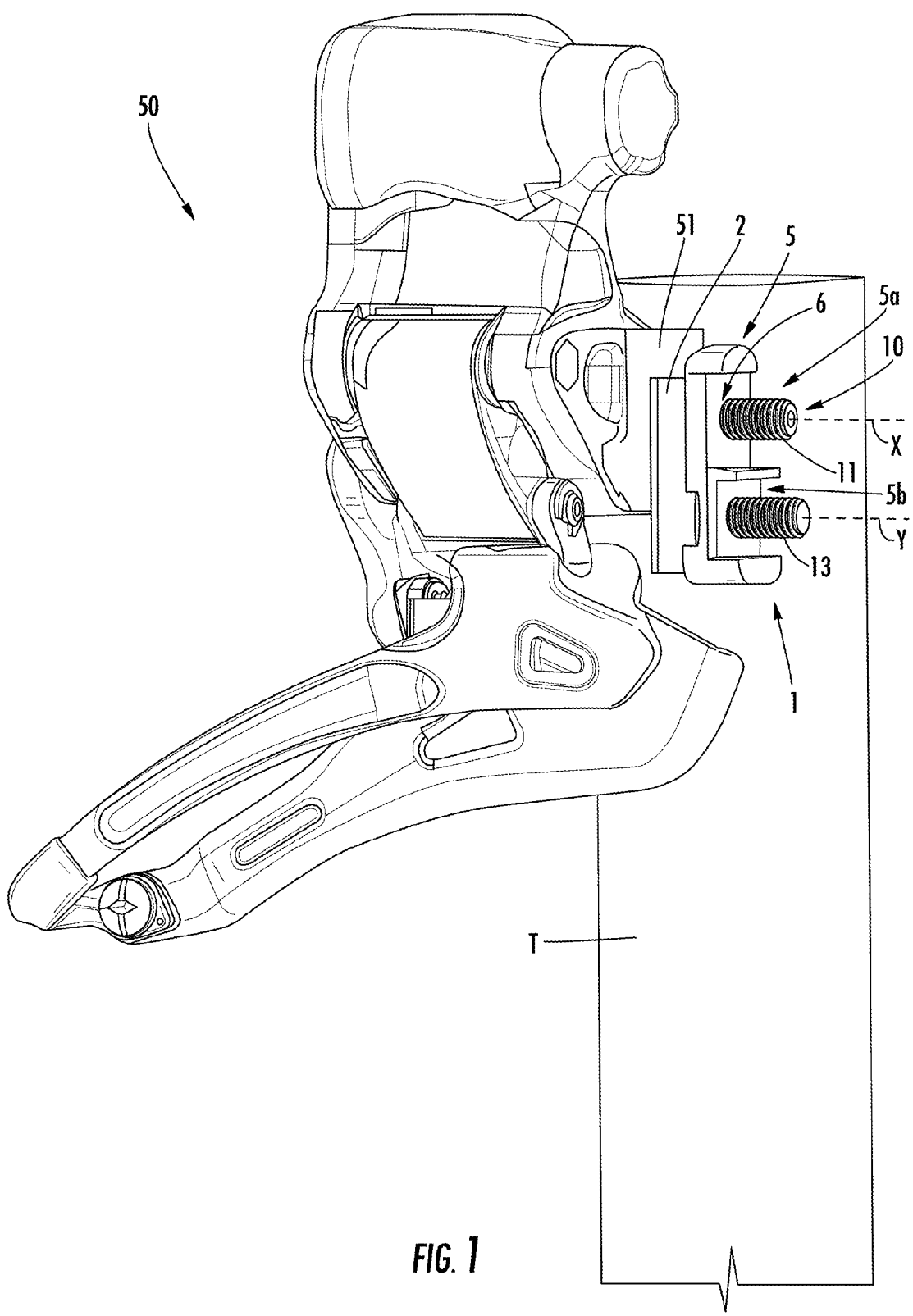

15 Claims, 17 Drawing Sheets

DEVICE FOR STOPPING THE LATERAL DISPLACEMENT OF A BICYCLE CHAIN

CROSS REFERENCE TO RELATED APPLICATION(S)

This application claims the benefit of Italian Application No. MI2013A001641, which was filed on Oct. 4, 2013, and is incorporated herein by reference as if fully set forth.

FIELD OF INVENTION

The present invention relates to a device for stopping the lateral displacement of a bicycle chain. Preferably, the technical field of the present invention is that of racing bicycles.

BACKGROUND

It is known mounting onto the bicycle frame, at the front derailleur, a special device configured to prevent the lateral displacement of the chain beyond the toothed crown having the smallest diameter of the crankset when gearshifting is carried out from a crown with a larger diameter to a crown with a smaller diameter.

Examples of such devices are described in US 2010/0172164, US 2011/0230287 and US 2013/0095969.

US 2013/0095969 describes a chain stop device configured to be mounted, in particular, on a bottle holder associated with the bicycle frame. Such a device comprises an element on which a rectilinear portion for attaching to the bottle holder and a curved portion for stopping the chain are defined.

US 2011/0230287 and US 2013/0095969, on the other hand, describe chain stop devices configured to be mounted on the same mounting element on which the front derailleur is mounted.

The Applicant has focussed its attention on the known solutions wherein the chain stop device is mounted on the same mounting element on which the front derailleur is mounted, like for example the solutions described in US 2011/0230287 and US 2013/0095969.

The Applicant has observed that, in order to obtain precise gearshifting while cycling and to allow the chain stop device to effectively carry out its function, both the front derailleur and the chain stop device must be positioned with precision with respect to the crankset.

The Applicant has observed that, in known solutions like for example those described in US 2011/0230287 and US 2013/0095969, the chain stop device is fixed to the mounting element on which the front derailleur is mounted through the same screw that locks the front derailleur onto the aforementioned mounting element. Therefore, whenever an intervention is made on the chain stop device to adjust its position with respect to the crankset, inevitably there is a risk of altering or compromising the correct positioning of the front derailleur with respect to the crankset and vice-versa.

The technical problem at the basis of the present invention is therefore that of being capable of adjusting the position of the chain stop device with respect to the crankset without in any way influencing the correct positioning of the front derailleur with respect to the crankset.

SUMMARY OF THE INVENTION

The invention provides as device for stopping lateral displacement of a bicycle chain. The device comprising: a mounting element, configured to be mounted on a bicycle frame, that includes a first portion configured to be coupled, at a first coupling axis, with a front derailleur of a bicycle, and a second portion configured to be coupled, at a second coupling axis distinct from said first coupling axis, with a stop element provided for stopping lateral displacement of said chain.

BRIEF DESCRIPTION OF THE DRAWING(S)

Figure 2:
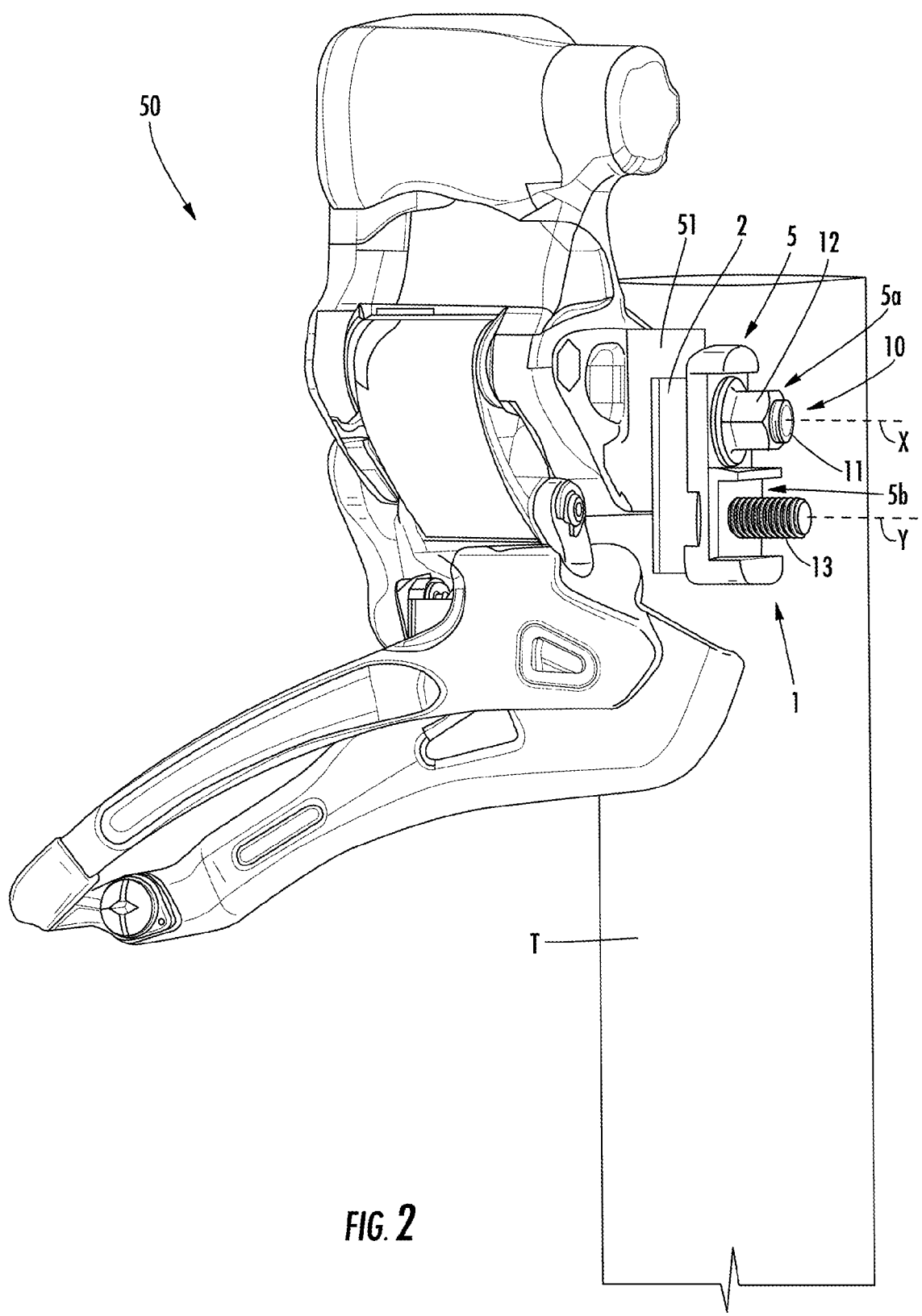
Figure 4:
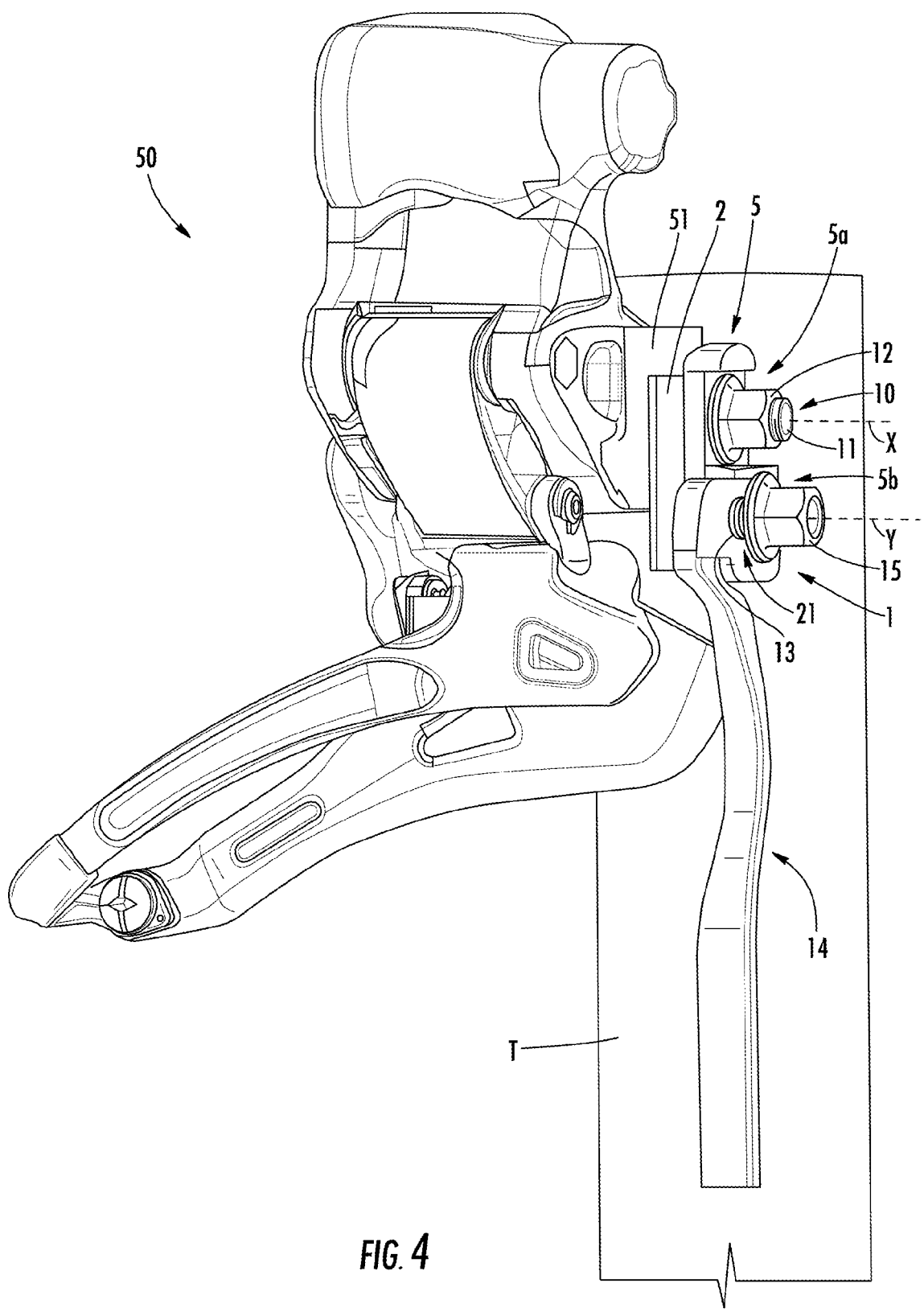
Figure 5:
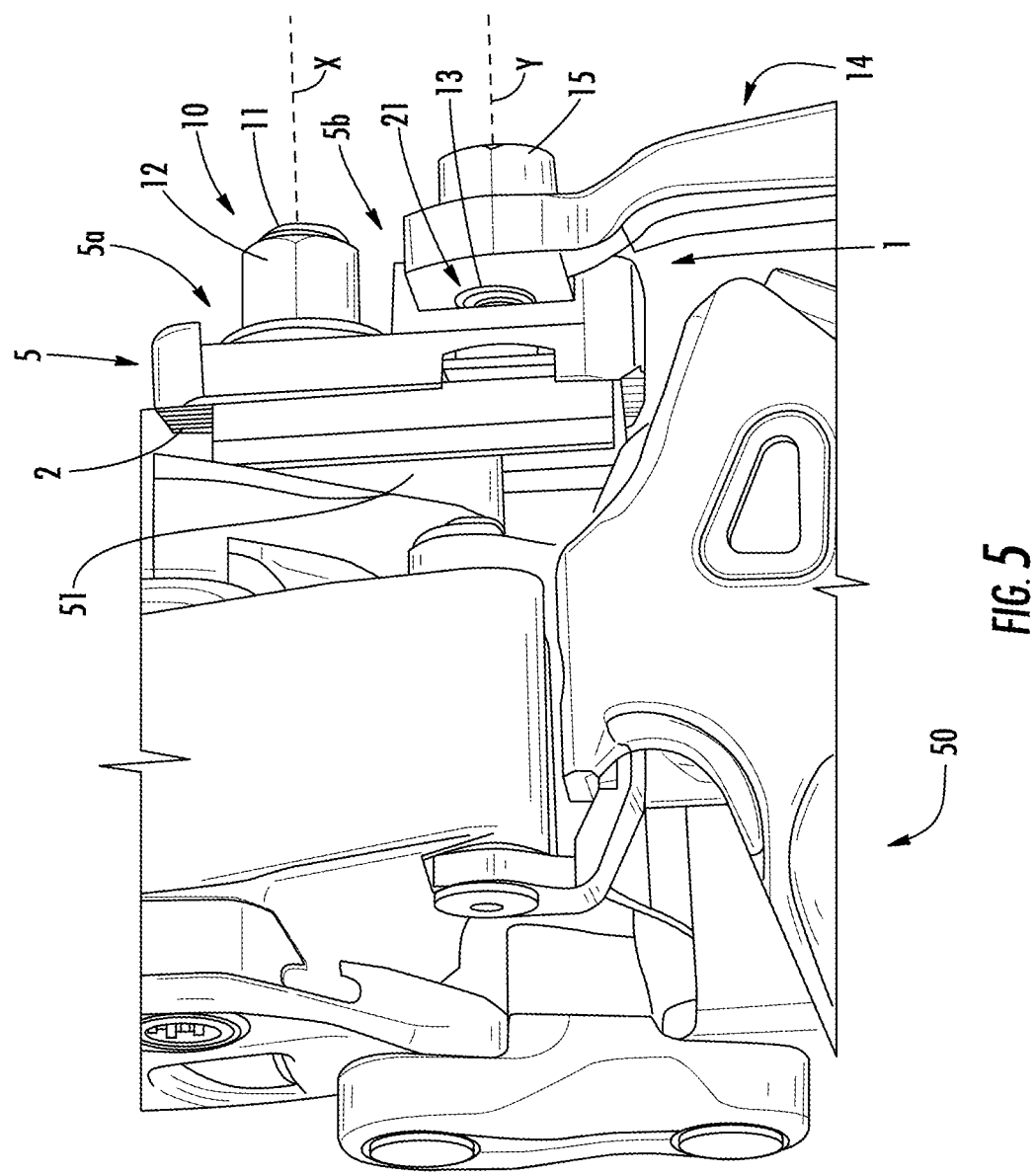
Figure 6:
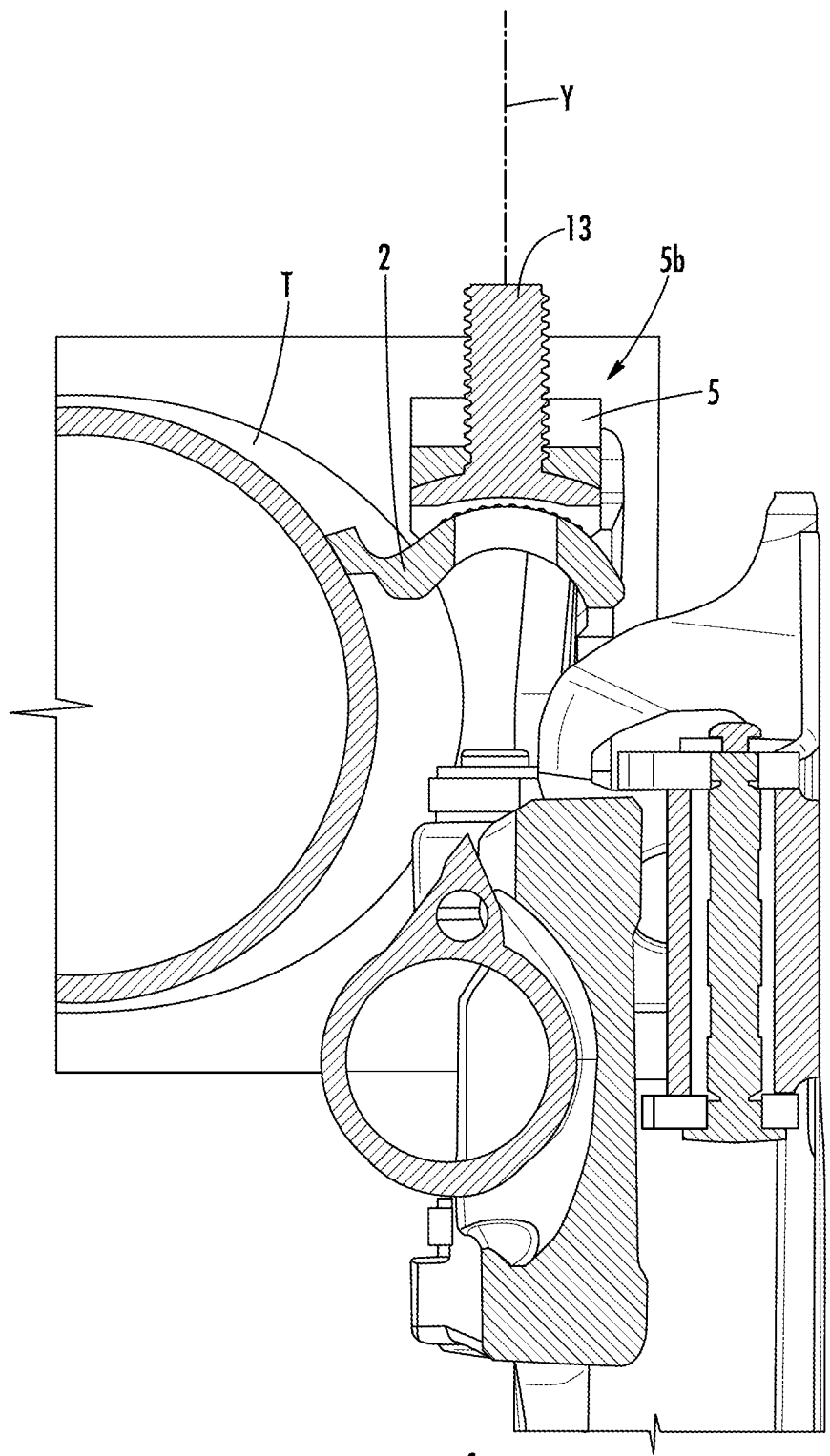
Figure 7:
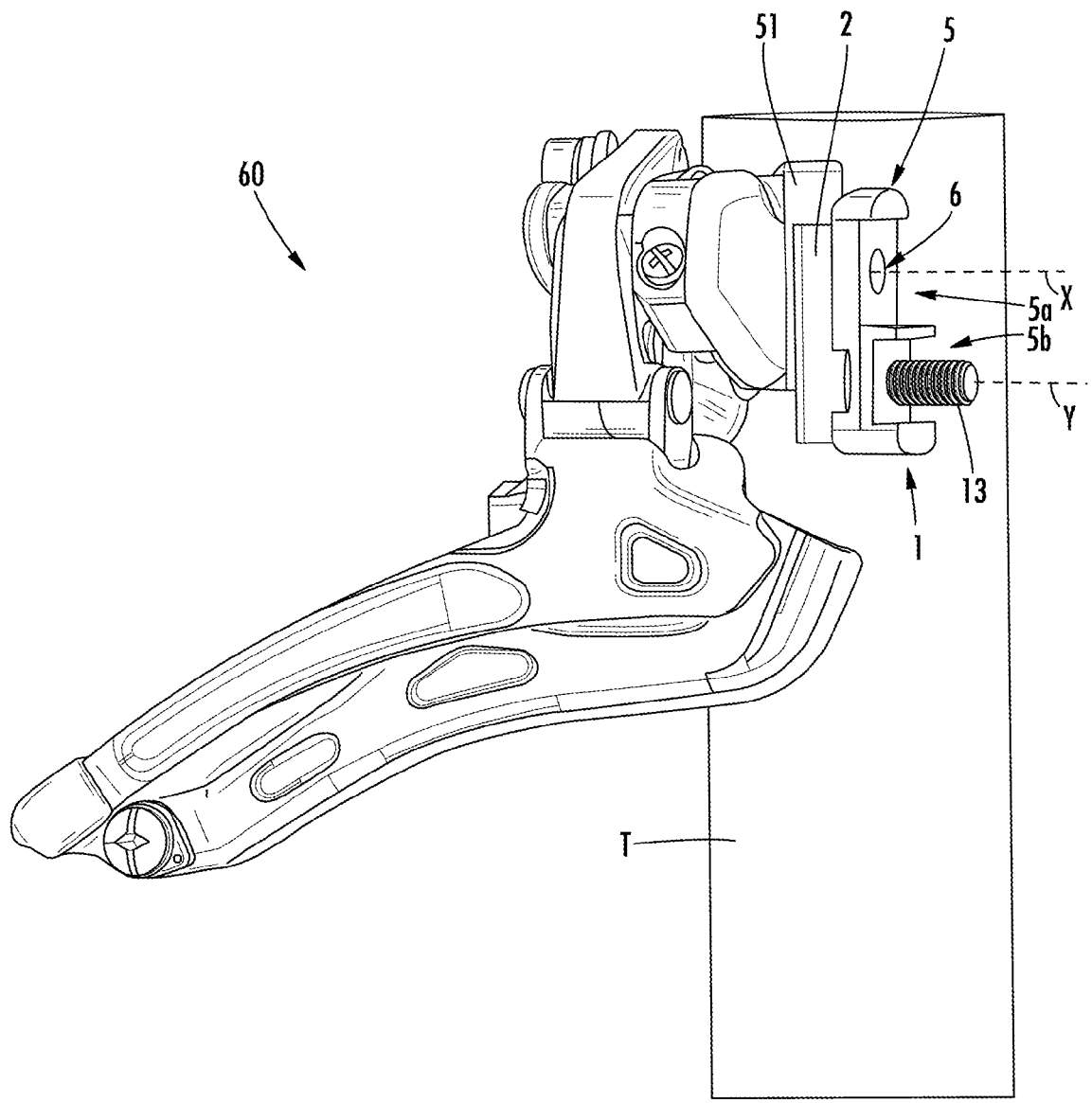
Figure 10:
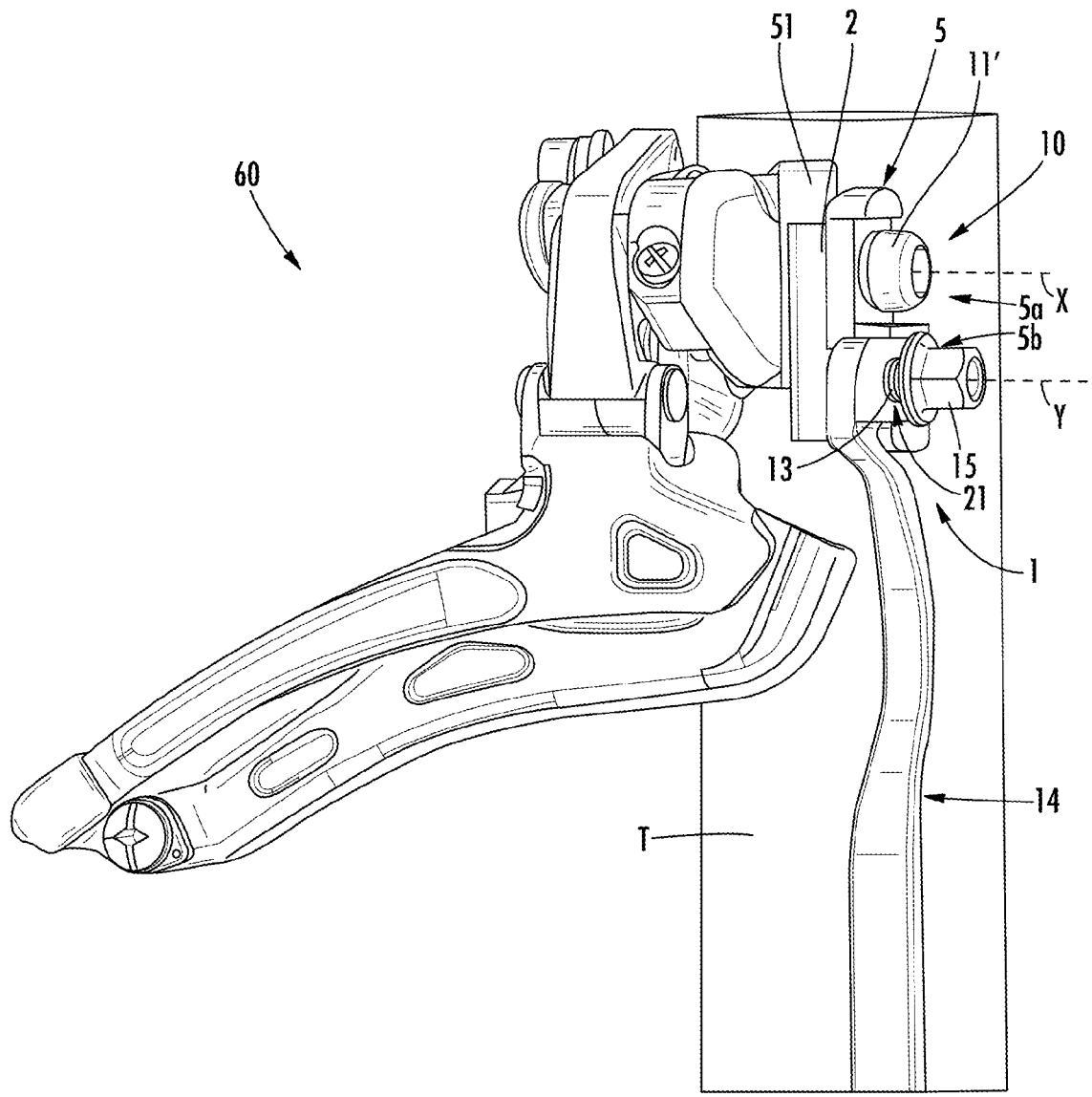
Figure 11:
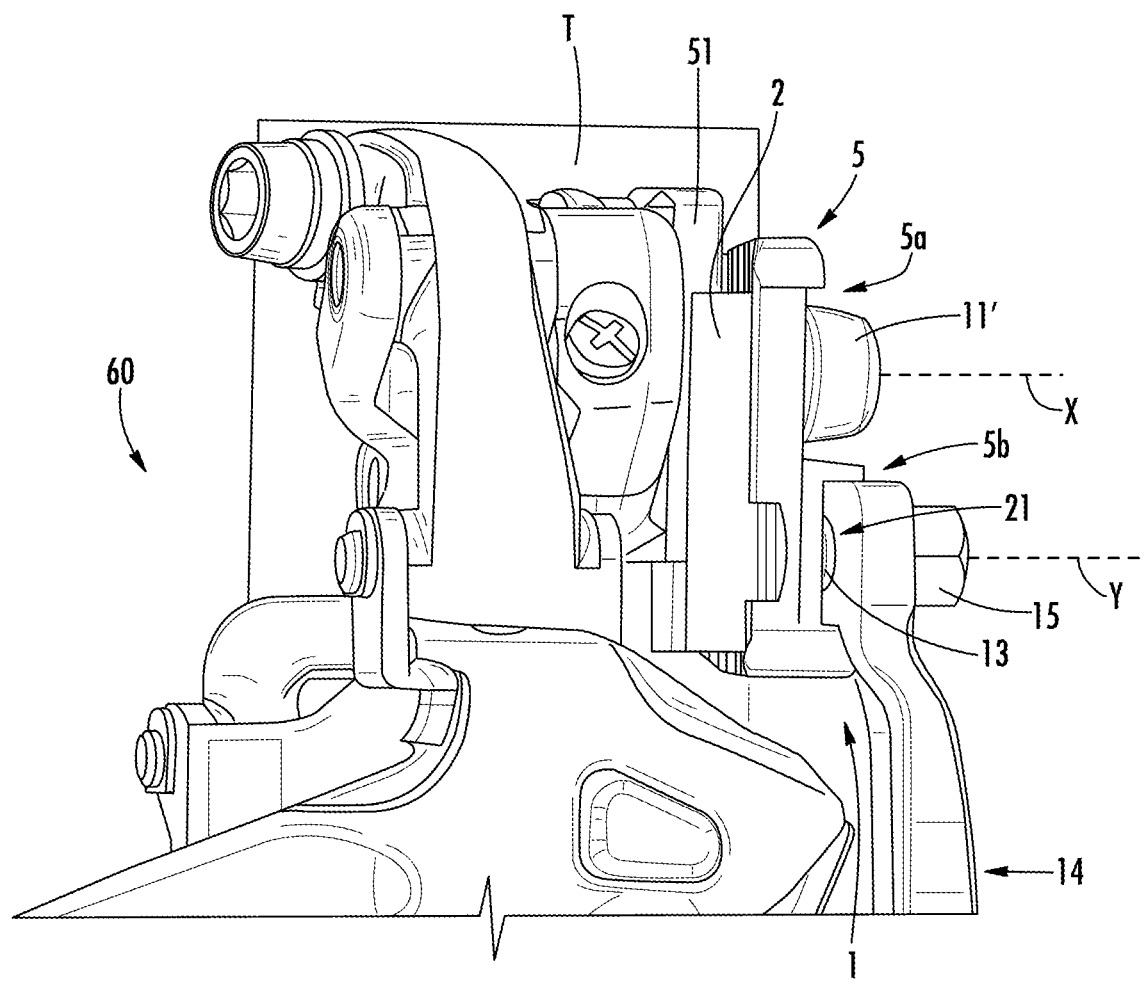
Figure 12:
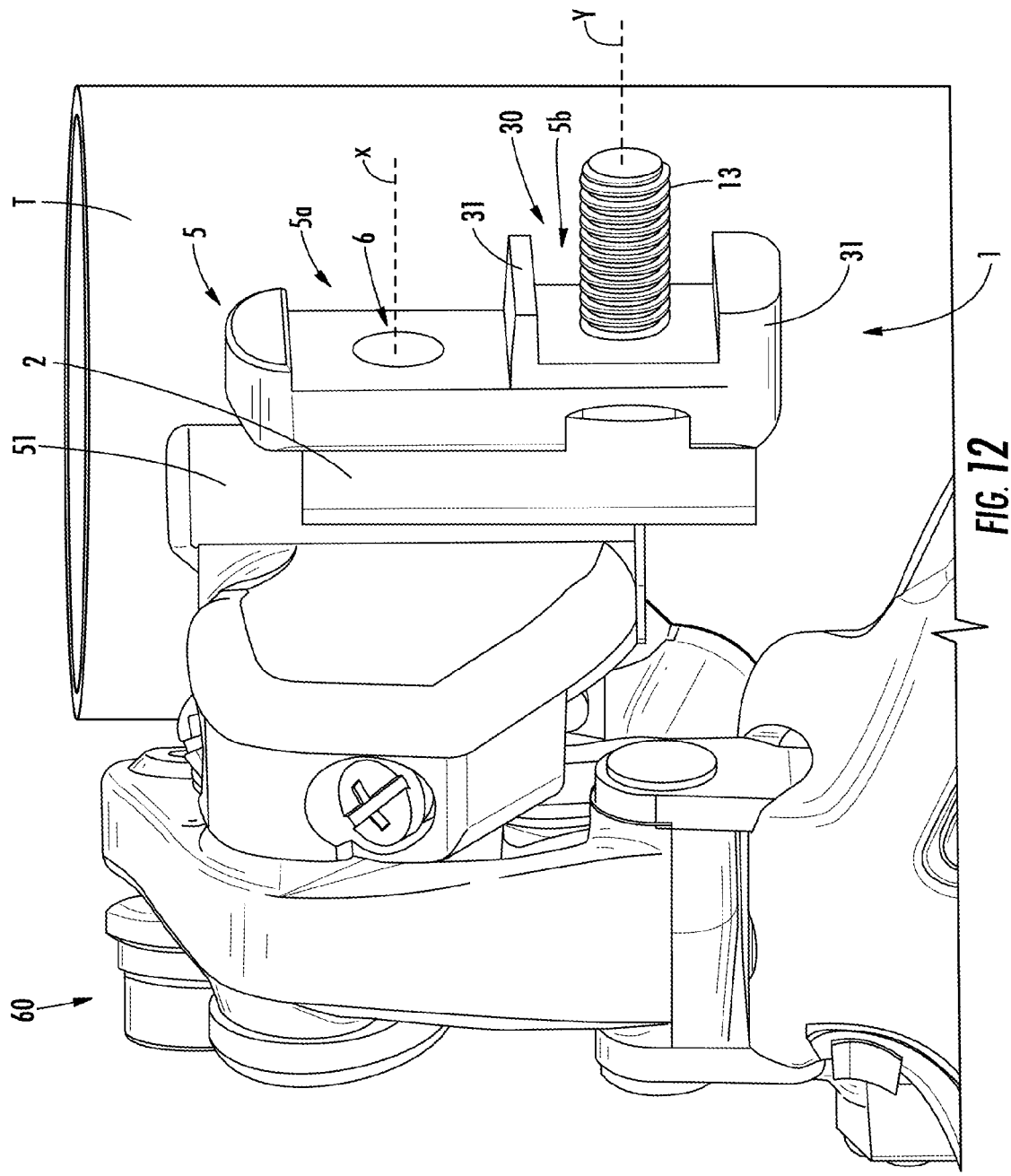
Figure 13:
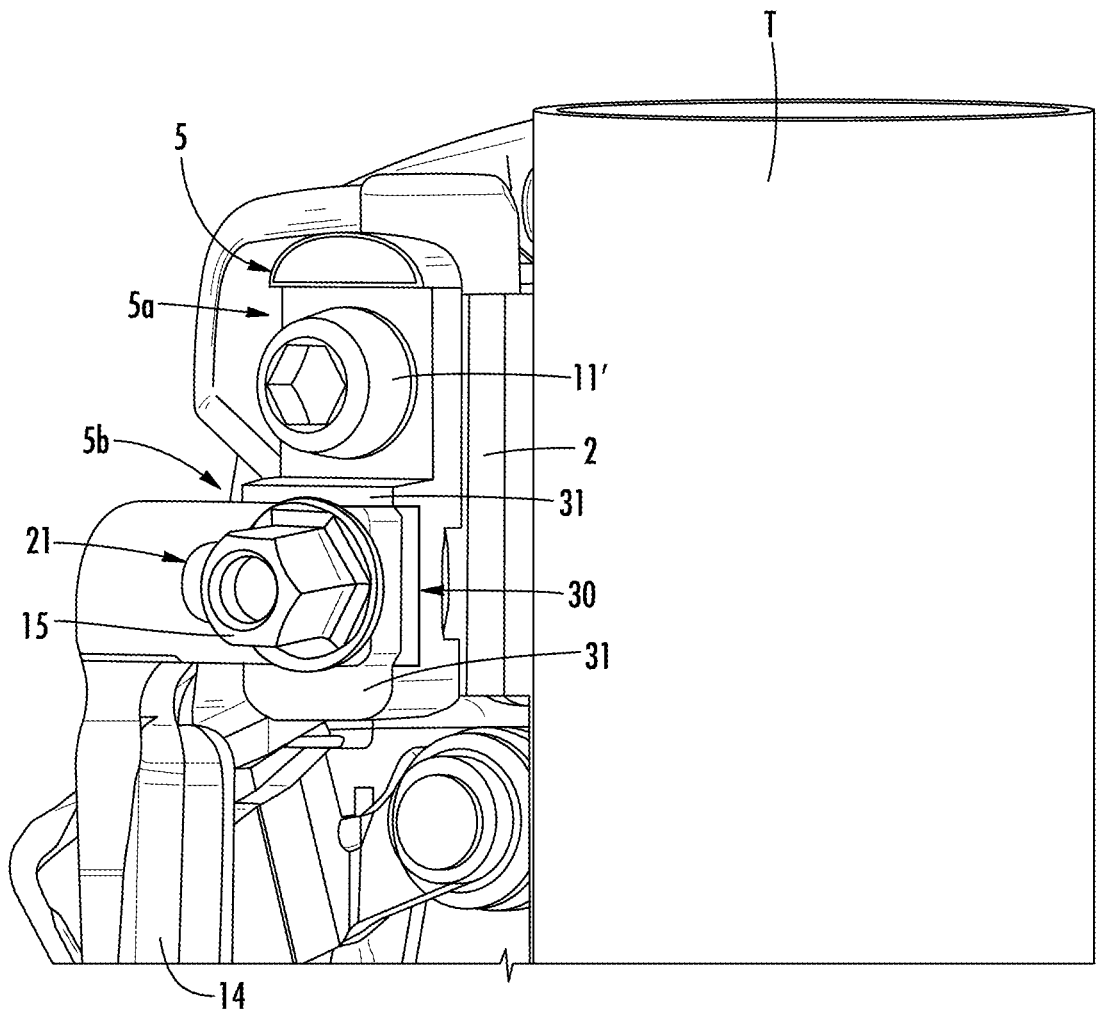
Figure 16:
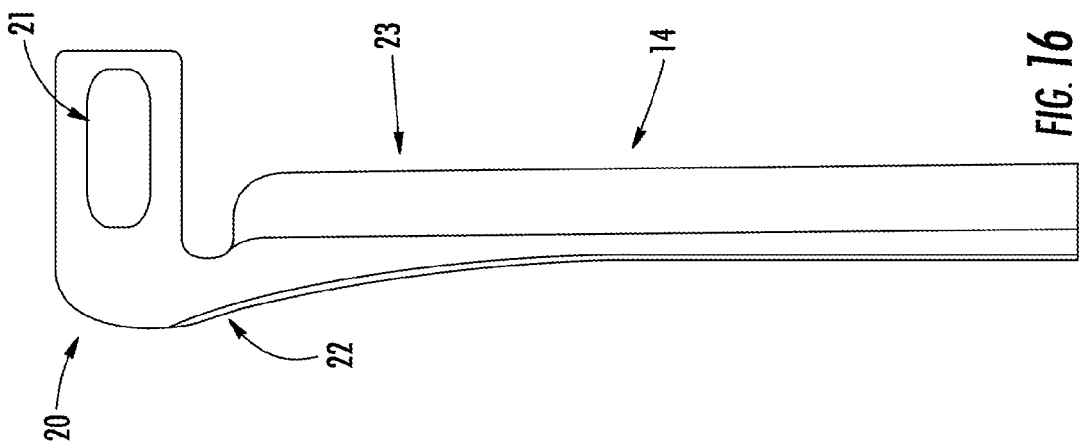
Figure 15:
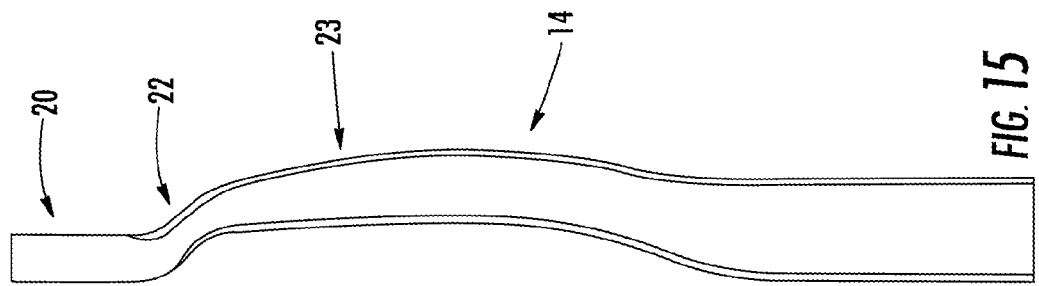
Figure 14:
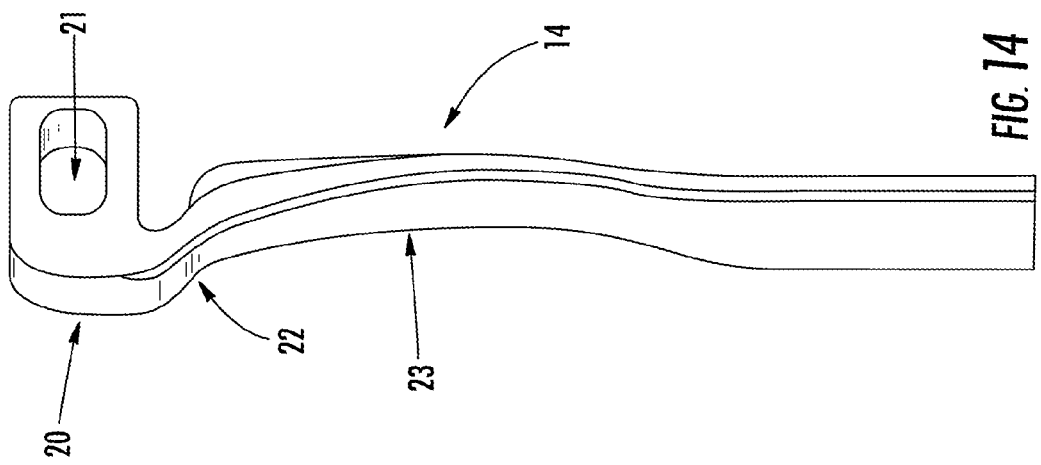
Figure 17:
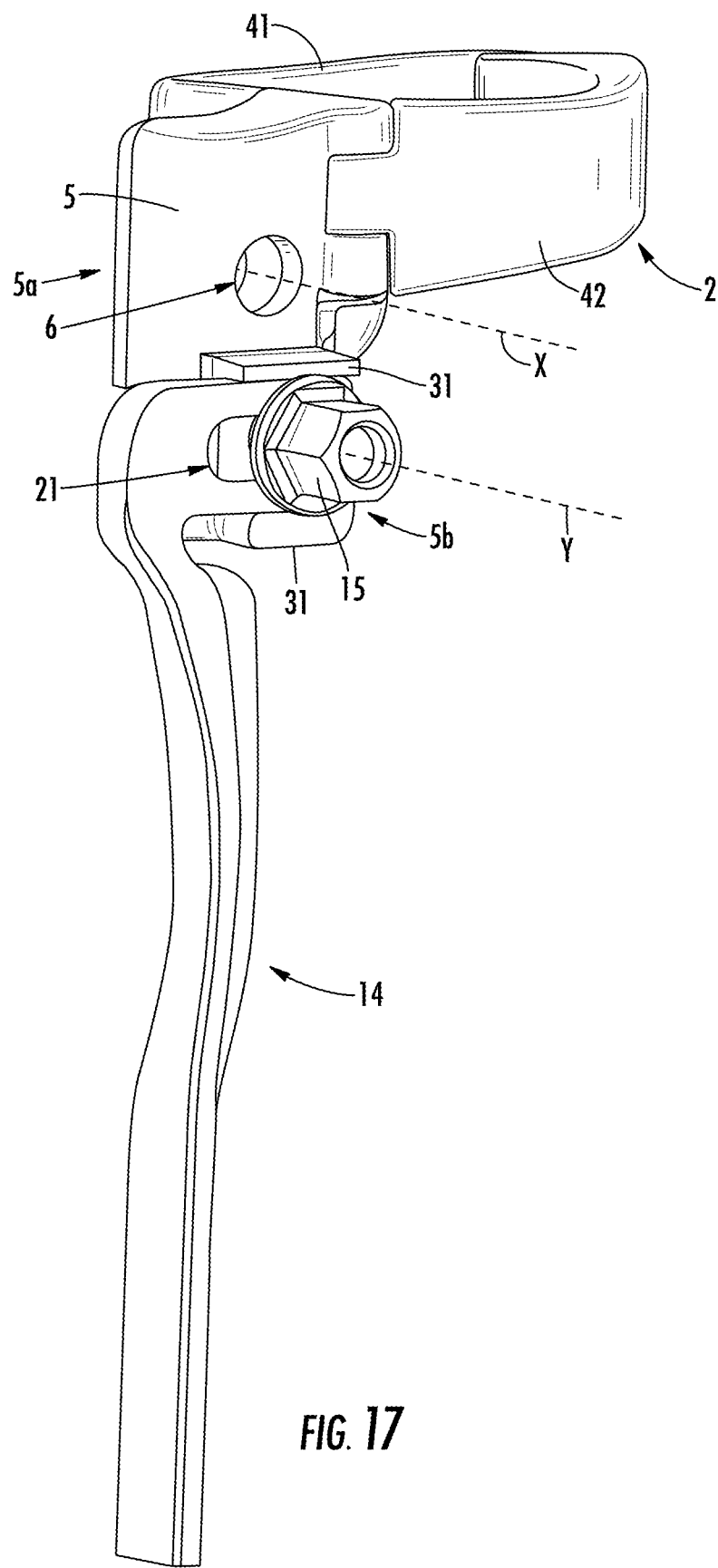
Figure 18:
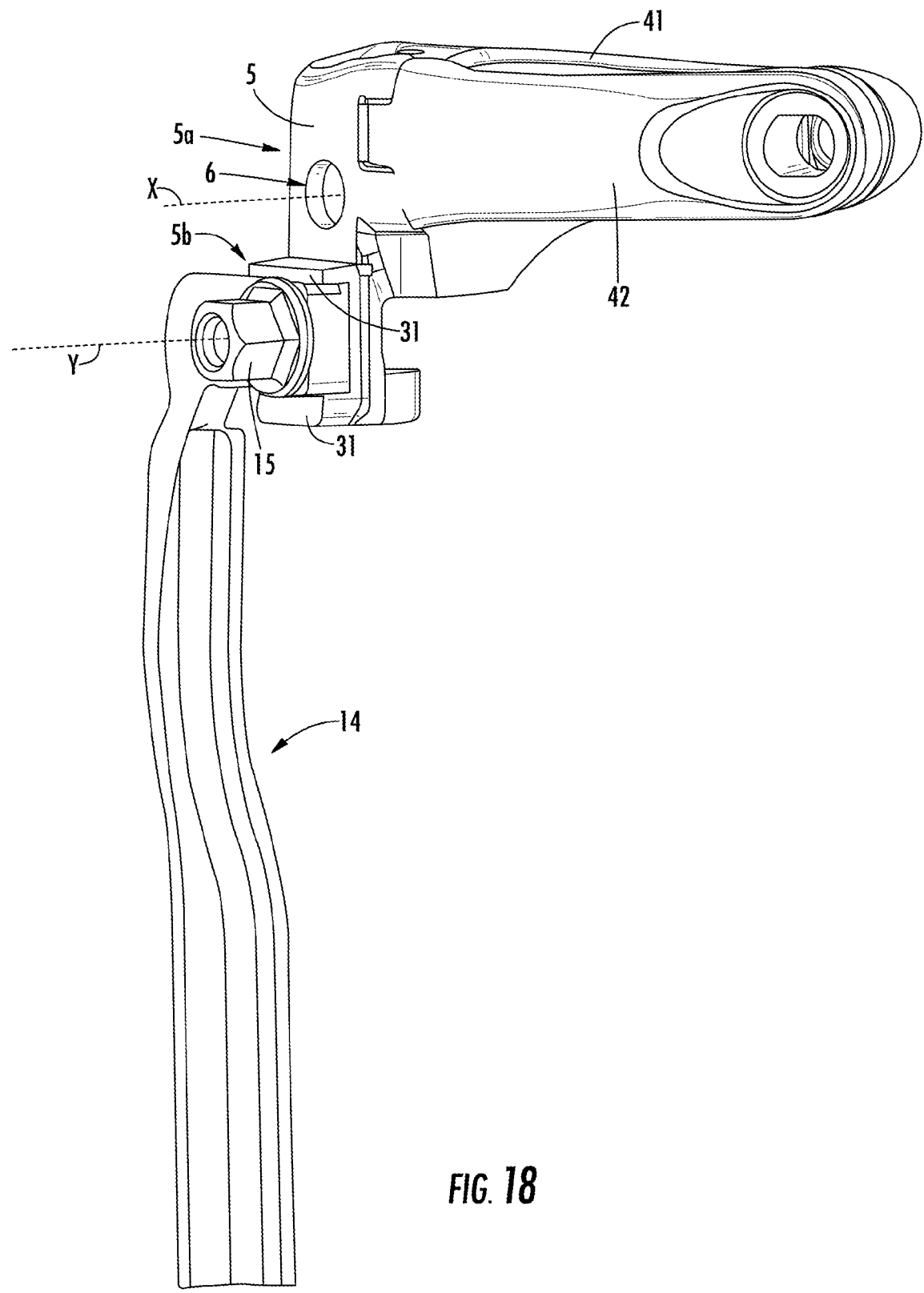
Figure 19:
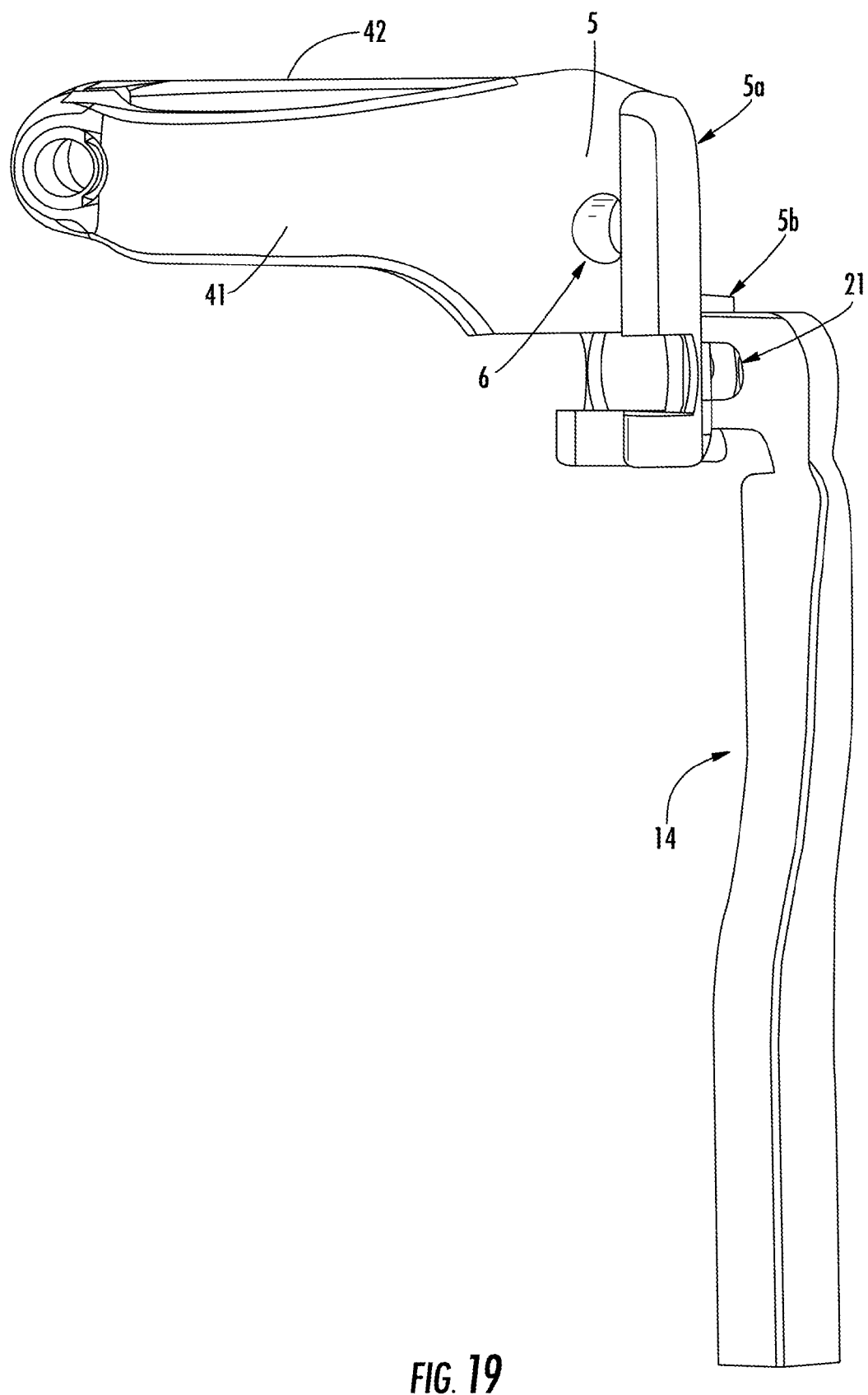

Further characteristics and advantages of the present invention will become clearer from the following detailed description of preferred embodiments thereof, made with reference to the attached drawings and given for indicating and not limiting purposes. In such drawings:

FIGS. 1-4 schematically represent perspective views of a first embodiment of a device for stopping the lateral displacement of a bicycle chain according to the present invention, in successive mounting steps onto a seat tube of a bicycle frame and in the case in which a motor-driven front derailleur is used;

FIG. 5 schematically represents an enlarged detail of the stop device of FIG. 4, taken from a different point of observation;

FIG. 6 schematically represents a cross section of the stop device of FIG. 2;

FIGS. 7-10 schematically represent perspective views of a second embodiment of a device for stopping the lateral displacement of a bicycle chain according to the present invention, in successive mounting steps onto a seat tube of a bicycle frame and in the case in which a manually actuated derailleur is used;

FIG. 11 schematically represents an enlarged detail of the stop device of FIG. 10, taken from a different point of observation;

FIG. 12 schematically represents an enlarged detail of the stop device of FIG. 7;

FIG. 13 schematically represents an enlarged detail of the stop device of FIG. 10, taken from a different point of observation from that of FIGS. 10 and 11;

FIGS. 14-16 schematically represent perspective views of a component of the stop device of FIGS. 1-4 and 7-10, taken from three different points of observation;

FIGS. 17-19 schematically represent perspective views of a third embodiment of a device for stopping the lateral displacement of a bicycle chain according to the present invention, taken from three different points of observation.

DETAILED DESCRIPTION OF THE PREFERRED EMBODIMENT(S)

The present invention provides a device for stopping the lateral displacement of a bicycle chain, characterised in that it comprises a mounting element configured to be mounted on a bicycle frame, said mounting element comprising:

A first portion configured to be coupled, at a first coupling axis, with a front derailleur of a bicycle, and A second portion configured to be coupled, at a second coupling axis distinct from said first coupling axis, with a stop element provided for stopping the lateral displacement of said chain.

The Applicant has advantageously found that, thanks to the use of the aforementioned mounting element and to the provision of two distinct coupling portions, respectively, with the front derailleur and with the aforementioned stop element, it is possible to carry out the position adjustment operations of the aforementioned stop element without intervening on elements or components used to fix in position the front derailleur with respect to the crankset. In the same way, the position adjustment operations of the front derailleur with respect to the crankset can be carried out and completed independently from the position adjustment operations of the aforementioned stop element. Indeed, the fixing in precise position of the stop element provided for stopping the lateral displacement of the chain with respect to the crankset takes place by acting on a portion of the mounting element that is distinct from the portion on which the user acts in order to adjust the position of the front derailleur with respect to the crankset.

Preferably, said second coupling axis is parallel to said first coupling axis.

More preferably, the second portion is arranged at a lower position with respect to said first portion when said mounting element is mounted on said bicycle frame.

In the preferred embodiments of the present invention, said mounting element comprises, coaxially to said first coupling axis, a hole configured to receive a first screw provided for fixing said front derailleur to said mounting element.

Preferably, said hole is a through hole.

Preferably, in the case of motor-driven derailleurs (such derailleurs are also known as motorised derailleurs), said first screw is fixedly associated with an attachment portion of the front derailleur. In this case, the locking of the front derailleur on the mounting element is achieved through screwing of a lock nut onto an end portion of the first screw that projects from said through hole.

Preferably, in the case of manually actuated derailleurs (such derailleurs are also known as mechanical derailleurs), the first screw is provided with a head and it is configured to be screwed into a threaded hole formed on the attachment portion of the front derailleur.

The aforementioned screw (and the possible lock nut, if provided) allows the front derailleur to be locked onto the mounting element at a desired height with respect to the crankset.

In the present description and in the subsequent claims, the expression "fixedly associated" is used to indicate a stable coupling without relative motion between two distinct elements.

Preferably, the device of the present invention comprises, at said second coupling axis, a second screw provided for fixing said stop element to said mounting element.

More preferably, said second screw is fixedly associated, preferably co-moulded, with said mounting element.

Moreover, preferably said stop element comprises a through opening for the passage of said second screw.

More preferably, the device of the present invention in this case provides for a lock nut configured to be screwed onto a portion of said second screw projecting from said through opening.

In an alternative embodiment of the device of the present invention, the mounting element comprises, at said second coupling axis, a threaded hole configured to receive a screw provided with a head.

In the preferred embodiments of the present invention, said through opening is defined by a slot. Such a slot allows the stop element provided for stopping the lateral displacement of the chain to be moved towards and away from the crankset until the desired optimal position has been reached.

Preferably, the device of the present invention comprises a sliding guide for mounting said stop element on said mounting element. The positioning and position adjustment of the stop element on the mounting element thus takes place through the effect of a guided sliding of the stop element on the mounting element.

More preferably, said sliding guide is defined in said second portion of said mounting element.

The device of the present invention preferably comprises means for preventing the relative rotation of said stop element with respect to said mounting element.

More preferably, said means for preventing the relative rotation are defined in said second portion of said mounting element.

In the preferred embodiments of the present invention, said means for preventing the relative rotation are defined by said sliding guide, i.e. the sliding guide prevents the relative rotation of said stop element with respect to said mounting element.

Preferably, said mounting element comprises, in said second portion, a pair of projecting canti-levered tabs arranged on opposite sides with respect to said second coupling axis.

Preferably, said tabs are parallel to one another and define said sliding guide.

In the preferred embodiments of the present invention, said stop element comprises a side surface and, on said side surface, a first surface portion configured to go into abutment against said second portion of said mounting element, a second surface portion configured to go into abutment with said chain and a joining surface portion between said first surface portion and second surface portion, wherein said second surface portion is curved. Such a curved surface portion performs the dual function of stopping the lateral displacement of the chain beyond the toothed crown with the smallest diameter and redirecting the chain towards said cr toothed crown.

In some preferred embodiments of the present invention, said mounting element is a distinct piece from a support element configured to support said front derailleur on said bicycle frame. In this case, said support element is preferably an element projecting from, and preferably welded to, the frame of the bicycle, more preferably to the seat tube of the bicycle.

In other preferred embodiments of the present invention, said mounting element is made in one piece with the aforementioned support element. In this last case, said support element is preferably a hose clamp configured to be tightened onto said bicycle frame, more preferably onto the seat tube of the bicycle.

In accordance with the present invention, the mounting element and the stop element are mounted on the aforementioned support element on the opposite sides with respect to the front derailleur. This contributes to making the mounting operations of the front derailleur operatively disconnected from those for mounting the aforementioned stop element.

Initially with reference to FIGS. 1-6, reference numeral 1 indicates a first embodiment of a device for stopping the lateral displacement of a bicycle chain (not illustrated) in accordance with the present invention.

The stop device 1 is mounted on a bicycle frame T at a front derailleur 50. In the non-limiting example of FIGS. 1-6 the front derailleur 50 is a motor-driven derailleur.

The stop device 1 comprises a mounting element 5 mounted on the frame T. In particular, the mounting element 5 is associated with a support element 2 projecting from the seat tube of the bicycle frame T (preferably welded onto the seat tube). Such a support element 2 has a vertical slot to allow the position of the front derailleur 50 and of the stop device 1 to be adjusted to the desired height with respect to the crankset (not illustrated) of the bicycle.

As illustrated more clearly in FIG. 5, the mounting element 5 comprises a first portion 5a coupled, at a first coupling axis X, with the front derailleur 50, and a second portion 5b arranged at a lower position with respect to the first portion 5a and coupled, at a second coupling axis Y distinct from the first coupling axis X, with a stop element 14 provided for stopping the lateral displacement of the chain. In the non-limiting example illustrated, the second coupling axis Y is substantially parallel to the first coupling axis X, but it could also be not parallel thereto.

The mounting element 5 and the stop element 14 are mounted on the support element 2 on the opposite sides with respect to the front derailleur 50.

In FIGS. 1-6 reference numeral 10 globally indicates the means provided for fixing the front derailleur 50 to the support element 2 and to the mounting element 5 at the first coupling axis X. In the non-limiting example illustrated and described herein, the means 10 comprise a screw 11 and a lock nut 12.

The screw 11 is configured to pass through the slot of the support element 2 and a through hole 6 formed on the mounting element 5 coaxially to the first coupling axis X.

Preferably, the screw 11 is fixedly associated with an attachment portion 51 of the front derailleur 50. The locking of the front derailleur 50 on the support element 2 and on the mounting element 5 is achieved through screwing of the lock nut 12 on an end portion of the screw 11 that projects from the through hole 6 of the mounting element 5.

In an alternative embodiment that is not illustrated, the screw 11 is provided with a head and it is screwed into a threaded hole formed on the attachment portion 51 of the front derailleur 50.

The stop device 1 also comprises, coaxially to the second coupling axis Y, a screw 13 provided for fixing the stop element 14 to the mounting element 5.

The screw 13 is configured to pass through a through opening 21 formed on the mounting element 5 coaxially to the first coupling axis X.

Preferably, the screw 13 is co-moulded with the mounting element 5, as illustrated in FIG. 6. Alternatively, the screw 13 could be associated with the mounting element 5 by interference.

In the non-limiting example illustrated, the through opening 21 is defined by a slot. Such a slot allows the position of the stop element 14 with respect to the crankset to be adjusted along a direction substantially parallel to the rotation axis of the crankset until the desired optimal position has been reached.

The locking of the stop element 14 on the mounting element 5 in the desired position with respect to the crankset is achieved by screwing a lock nut 15 on a portion of the screw 13 projecting from the through opening 21.

The stop element 14 is illustrated in detail in FIGS. 14-16.

The stop element 14 comprises a side surface and, on the side surface, a first surface portion 20 (where the through opening 21 is formed) that goes into abutment against the second portion 5b of the mounting element 5, a second surface portion 23 that goes into abutment with the chain of the bicycle and a joining surface portion 22 between the first surface portion 20 and second surface portion 23.

The second surface portion 23 is curved.

In the non-limiting example illustrated in FIGS. 1-6, the mounting element 5 is a distinct piece from the support element 2, but it could also be made in one piece with the support element 2.

FIGS. 7-13 show a second embodiment of a device for stopping the lateral displacement of the chain according to the present invention, also wholly indicated with 1.

In FIGS. 7-13, structural elements that are identical or functionally equivalent to those of the stop device 1 described above with reference to FIGS. 1-6 will be given the same reference numerals and they will not be described any further.

Such an embodiment differs from the one described earlier in that the front derailleur, indicated with 60, is a manually-actuated derailleur and in that, unlike the previous embodiment, in this case the fixing means 10 comprise a screw 11' provided with a head that screws into a threaded hole (not illustrated) formed in the attachment portion 51 of the front derailleur 60.

In both of the embodiments described above, the stop device 1 comprises a sliding guide 30 for mounting the stop element 14 on the mounting element 5.

As clearly shown in particular in FIGS. 12-13, the sliding guide 30 is defined in the second portion 5b of the mounting element 5. In the non-limiting example illustrated herein, the sliding guide 30 also acts as a means for preventing the relative rotation of the stop element 14 with respect to the mounting element 5.

Such a sliding guide 30 is defined in particular by a pair of tabs 31. The tabs 31 are substantially parallel to one another. The tabs 31 project canti-levered from the mounting element 5 and are arranged on opposite sides with respect to the second coupling axis Y. Each tab 31 is configured to guide the sliding of a respective side surface of the surface portion 20 of the stop element 14 during mounting of the stop element 14 on the mounting element 5, and, in operation, to prevent the relative rotation of the stop element 14 with respect to the mounting element 5.

FIGS. 17-19 show a third embodiment of a device for stopping the lateral displacement of the chain according to the present invention, also wholly indicated with 1.

In FIGS. 17-19, structural elements that are identical or functionally equivalent to those of the stop device 1 described above with reference to FIGS. 1-6 and 7-13 will be given the same reference numerals and they will not be described any further.

Such an embodiment differs from those described earlier in that in this case the mounting element 5 is made in one piece with the support element 2 of the front derailleur on the bicycle frame T. Such a support element 2 in particular is a hose clamp configured to be tightened on the seat tube of the frame T.

The hose clamp illustrated in FIGS. 17-19 comprises two jaws 41 and 42, and the mounting element 5 is made in one piece with one of the two jaws (the jaw 41 in the illustrated example).

The mounting of the stop devices 1 described above with reference to FIGS. 1-6, 7-13 and 17-19 is described hereafter.

The stop devices 1 of FIGS. 1-6 and 7-13 both provides for mounting the front derailleur 50, 60 and the mounting element 5 on the support element 2 at a desired height with respect to the crankset.

Figure 8:
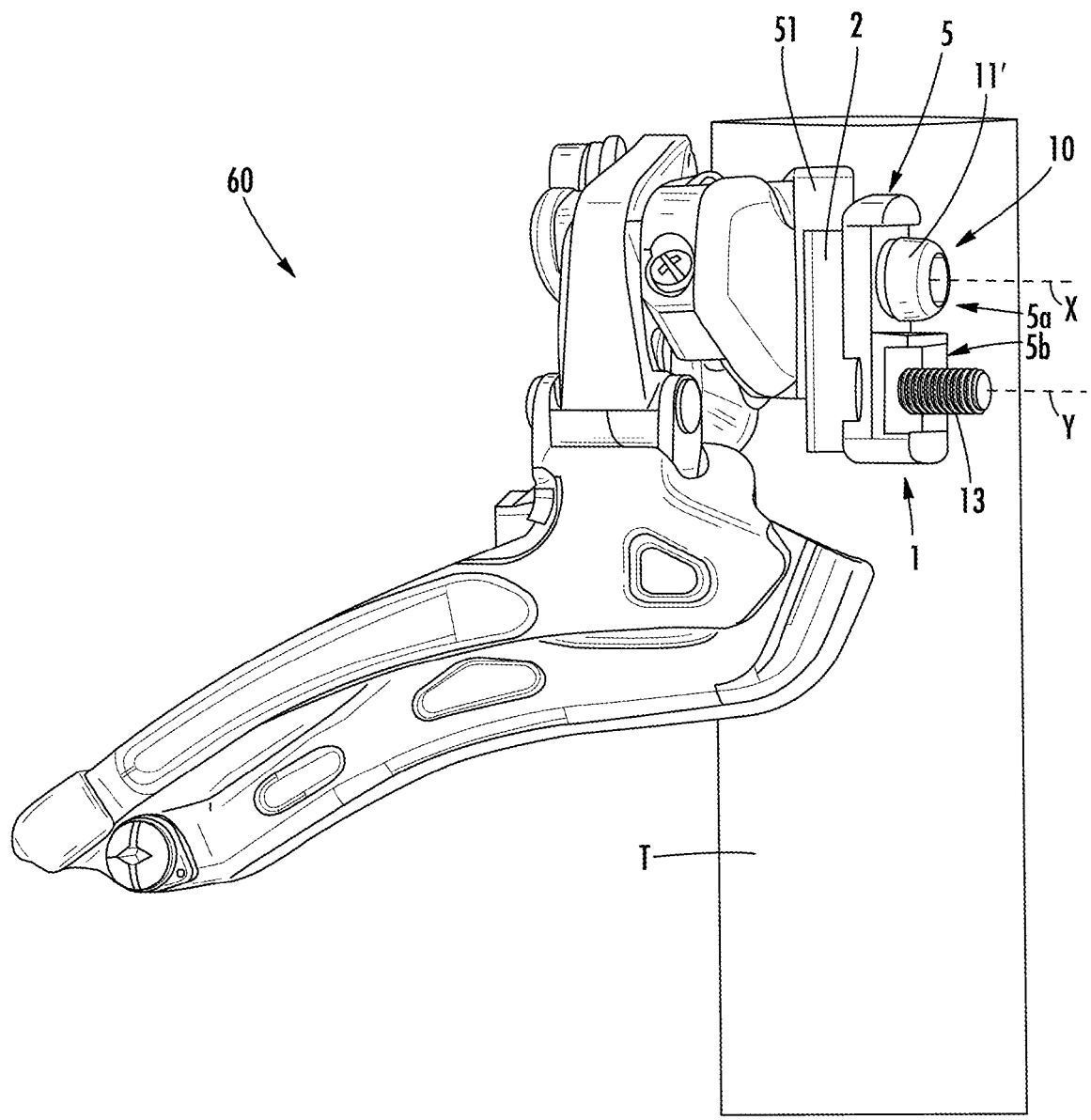

In particular, as shown in FIGS. 1 and 7, the front derailleur 50, 60 and the mounting element 5 are mounted on opposite sides with respect to the support element 2 making the screw 11, 11' pass through the slot of the support element 2 and the hole 6 of the mounting element 5. Once the desired position has been reached with respect to the crankset, the front derailleur 50, 60 and the mounting element 5 are fixed to the support element 2 by screwing the nut 12 onto the screw 11 (FIG. 2) or by screwing the screw 11' (FIG. 8).

Figure 3:
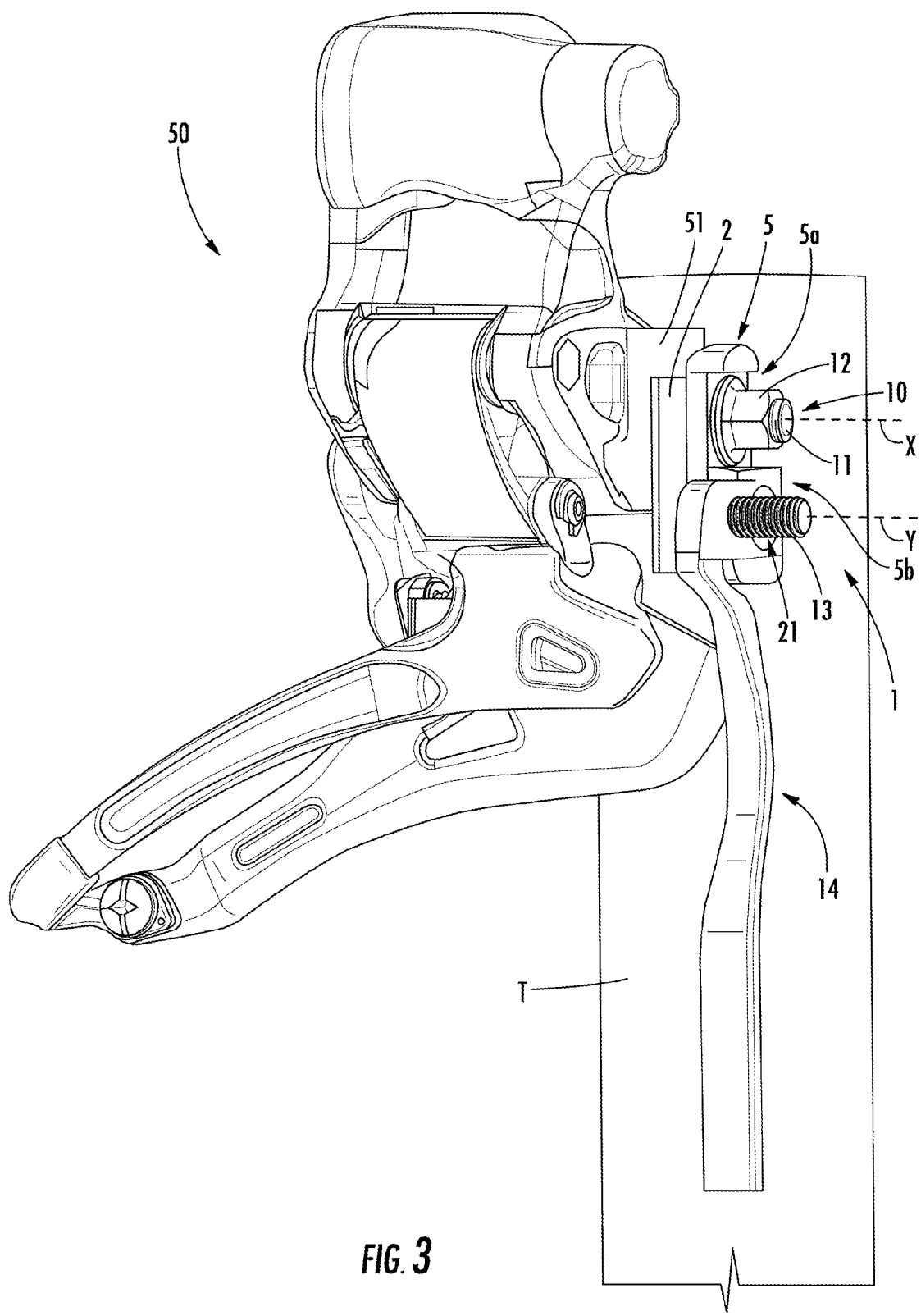
Figure 9:
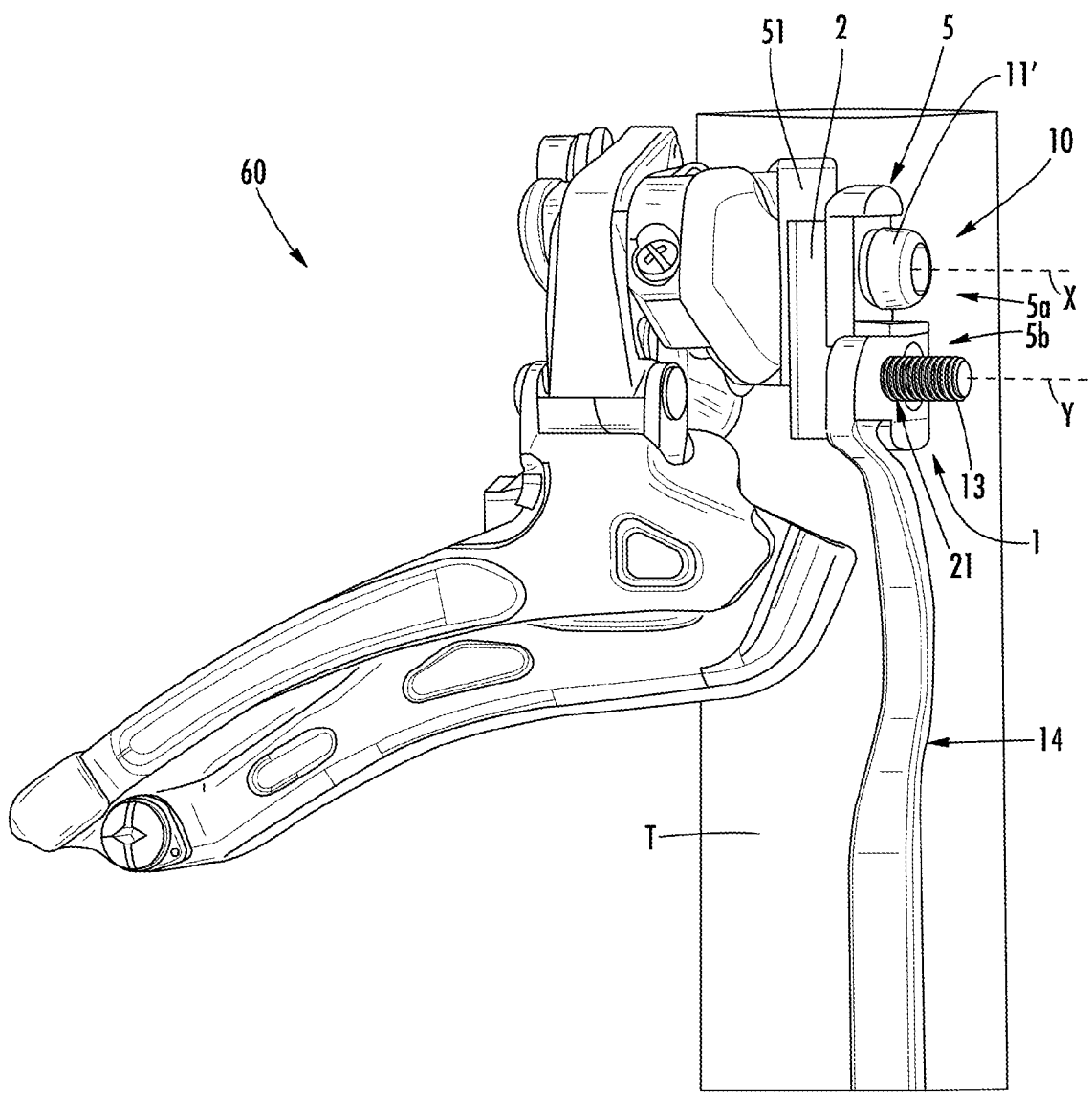

Thereafter, the stop element 14 is mounted on the mounting element 5 by making the screw 13 pass through the slot 21 (FIGS. 3 and 9). The stop element 14 is locked onto the mounting element 5, once the desired position has been reached with respect to the crankset, by screwing the lock nut 15 (FIGS. 4 and 10, respectively).

In the case of the stop device 1 of FIGS. 17-19, the hose clamp is tightened in advance on the seat tube of the frame T at a desired height by clamping the jaws 41, 42. As already stated, in the non-limiting embodiment illustrated the mounting element 5 is made in one piece with the jaw 41.

The front derailleur 50, 60 is thus mounted on the mounting element 5 by making the screw 11, 11' pass through the hole 6 of the mounting element 5. Once the desired position has been reached with respect to the crankset, the front derailleur 50, 60 is fixed to the hose clamp, by screwing the nut 12 onto the screw 11 (in the case in which the derailleur is as represented in FIGS. 1-6) or by screwing the screw 11' (in the case in which the derailleur is as represented in FIGS. 7-13).

The subsequent mounting steps of the stop element 14 on the mounting element 5 are totally analogous to those described above.

From what has been discussed above it is clear that in all of the non-limiting example embodiments described and illustrated, the mounting and position-adjustment of the stop element 14 with respect to the crankset is obtained without altering or compromising the prior precise positioning of the front derailleur 50, 60 with respect to the crankset thanks to the possibility of operating at two distinct coupling axes X, Y defined on a mounting element 5 capable of being removably coupled to the frame T of the bicycle and operatively arranged between the front derailleur 50, 60 and the stop element 14.

Of course, a man skilled in the art can bring numerous modifications and variants to the device for stopping the lateral displacement of a bicycle chain described above, in order to satisfy specific and contingent requirements, all of which are in any case within the scope of protection of the present invention as defined by the following claims.

What is claimed is:

1. Device for stopping the lateral displacement of a bicycle chain, the device comprising:
   a mounting element configured to be mounted on a bicycle frame, said mounting element comprising:
   a first portion configured to be coupled, at a first coupling axis, with a front derailleur of a bicycle, and
   a second portion configured to be coupled, at a second coupling axis distinct from said first coupling axis, with a stop element provided for stopping the lateral displacement of said chain.

2. Device according to claim 1, wherein said second coupling axis is parallel to said first coupling axis.

3. Device according to claim 1, wherein said second portion is arranged at a lower position with respect to said first portion when said mounting element is mounted on said bicycle frame.

4. Device according to claim 1, wherein said mounting element comprises, coaxially to said first coupling axis, a hole, preferably a through hole, configured to receive a first screw provided for fixing said front derailleur to said mounting element.

5. Device according to claim 1, comprising, at said second coupling axis, a second screw provided for fixing said stop element to said mounting element, said second screw preferably being fixedly associated, more preferably co-moulded, with said mounting element.

6. Device according to claim 5, wherein said stop element comprises a through opening for the passage of said second screw, said through opening preferably being defined by a slot.

7. Device according to claim 6, comprising a lock nut configured to be screwed onto a portion of said second screw projecting from said through opening.

8. Device according to claim 1, comprising a sliding guide for mounting said stop element on said mounting element, said sliding guide preferably being defined in said second portion of said mounting element.

9. Device according to claim 1, comprising means for preventing the relative rotation of said stop element with respect to said mounting element, said means for preventing the relative rotation preferably being defined in said second portion of said mounting element.

10. Device according to claim 9, comprising a sliding guide for mounting said stop element on said mounting element, said sliding guide preferably being defined in said second portion of said mounting element, wherein said means for preventing the relative rotation are defined by said sliding guide.

11. Device according to claim 1, wherein said mounting element comprises, in said second portion, a pair of tabs projecting cantilevered and arranged on opposite sides with respect to said second coupling axis.

12. Device according to claim 11, comprising a sliding guide for mounting said stop element on said mounting element, said sliding guide preferably being defined in said second portion of said mounting element, wherein said tabs are parallel to one another and define said sliding guide.

13. Device according to claim 1, wherein said stop element comprises a side surface and, on said side surface, a first surface portion configured to go into abutment against said second portion of said mounting element, a second surface portion configured to go into abutment with said chain and a joining surface portion between said first surface portion and second surface portion, wherein said second surface portion is curved.

14. Device according to claim 1, wherein said mounting element is a distinct piece from a support element configured to support said front derailleur on said bicycle frame or, alternatively, said mounting element is made in one piece with a support element configured to support said front derailleur on said bicycle frame.

15. Device according to claim 14, wherein said mounting element is made in one piece with said support element and said support element is a clamp configured to be tightened on said bicycle frame.

* * * * *